(12) United States Patent
Schruff

(10) Patent No.: US 8,961,087 B2
(45) Date of Patent: Feb. 24, 2015

(54) BLIND RIVET ELEMENT

(71) Applicant: Herbert Schruff, Oestrich-Winkel (DE)

(72) Inventor: Herbert Schruff, Oestrich-Winkel (DE)

(73) Assignees: Simone Dregischan, Eltville (DE); Alexandra Vetter, Hofheim am Taunus (DE)

( * ) Notice: Subject to any disclaimer, the term of this patent is extended or adjusted under 35 U.S.C. 154(b) by 128 days.

(21) Appl. No.: 13/680,335

(22) Filed: Nov. 19, 2012

(65) Prior Publication Data

US 2013/0129442 A1    May 23, 2013

(30) Foreign Application Priority Data

Nov. 21, 2011    (EP) ..................... 11009212

(51) Int. Cl.
*F16B 19/10*    (2006.01)
*F16B 37/06*    (2006.01)

(52) U.S. Cl.
CPC ............ *F16B 19/1036* (2013.01); *F16B 37/065* (2013.01); *F16B 37/067* (2013.01)
USPC .............................................. 411/38; 411/183

(58) Field of Classification Search
USPC ................................................ 411/34, 38, 183
See application file for complete search history.

(56) References Cited

U.S. PATENT DOCUMENTS

| | | | | |
|---|---|---|---|---|
| 1,881,973 A | * | 10/1932 | Schmitt | 411/38 |
| 3,789,728 A | | 2/1974 | Shackelford | |
| 3,797,358 A | * | 3/1974 | Allender | 411/38 |
| 4,869,629 A | * | 9/1989 | Witzigman | 411/38 |
| 4,875,815 A | * | 10/1989 | Phillips, II | 411/38 |
| 6,538,894 B1 | | 3/2003 | Treiber | |
| 6,893,196 B2 | * | 5/2005 | Wille | 411/34 |
| 7,901,171 B2 | | 3/2011 | Schruff | |

FOREIGN PATENT DOCUMENTS

| | | |
|---|---|---|
| DE | 19808685 | 9/1999 |
| EP | 1918596 | 5/2008 |

* cited by examiner

*Primary Examiner* — Flemming Saether
(74) *Attorney, Agent, or Firm* — Price Heneveld LLP

(57) ABSTRACT

A blind rivet element includes a setting head attached to one head of a shank that is smaller in diameter than the setting head and has an opposite end with an internal female thread or a receptacle for a threaded bolt as well as a deformation section disposed axially therebetween. The blind rivet is inelastically deformed from an unset condition to a set condition thereby forming a radially outwardly protruding bead which serves to fasten the blind rivet element to a workpiece. The deformation section includes a void that interrupts the bead and defines a non-arcuate edge along that portion of the bead disposed adjacent to the void.

13 Claims, 5 Drawing Sheets

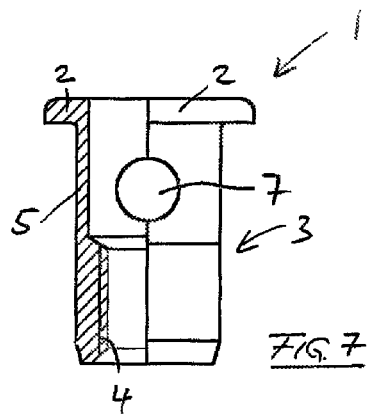
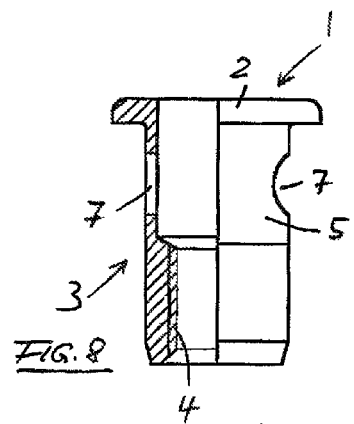
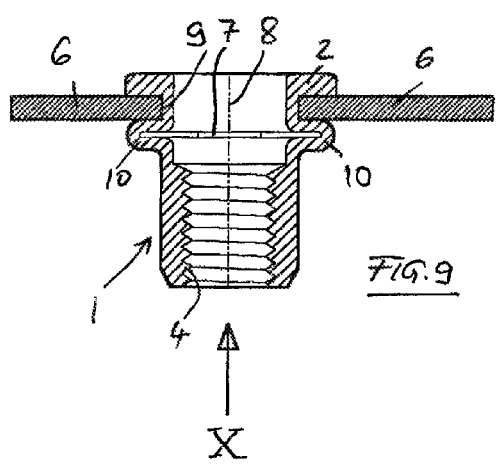
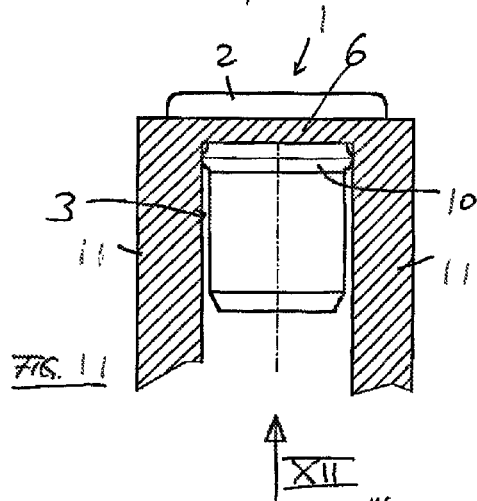
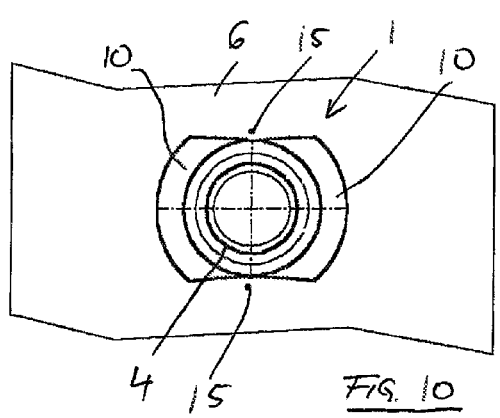
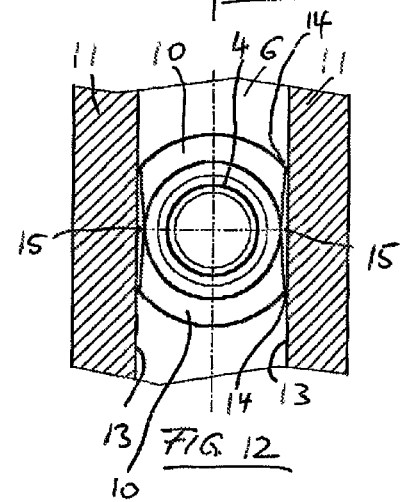

BLIND RIVET ELEMENT

CLAIM OF PRIORITY

Applicants hereby claim the priority benefits under the provisions of 35 U.S.C. §119, basing said claim of priority on European Patent Application Ser. No. 11009212.9, filed Nov. 21, 2011. In accordance with the provisions of 35 U.S.C. §119 and Rule 55(b), a certified copy of the above-listed European patent application will be filed before grant of a patent.

BACKGROUND OF THE INVENTION

The present invention relates to a blind rivet element having a setting head and a shank. The shank has a female thread or a receptacle for a threaded bolt at its end distal to the setting head, and a deformation section between the female thread or the bolt receptacle and the setting head. The setting head has a larger outside diameter than the shank. After deformation of the shank and creation of the closing head, the deformation section has a bead that extends on the exterior circumference of the shank.

Blind rivet elements of the above-noted type are designed for example as blind rivet nuts or blind rivet threaded bolts. EP 1 918 596 describes a blind rivet element of the type cited in the foregoing.

Blind rivet elements have proven appropriate for fastening tasks in which a screw connection is required in the area of thin-walled materials, for example metal sheets, into which it is not normally possible to cut a loadable thread. Blind rivet elements form the mating retainer flange, or closing head, by forming a bead that is in the form of a material fold. The lower the material strength of a thin-walled article, especially metal sheet, with which the blind rivet element of defined dimensions is to be connected, the greater the outer diameter of the bead. However, the radial extension of the bead is always relatively small with respect to the outer diameter of the shank of the blind rivet element.

DE 198 08 685 A1 also describes a blind rivet element of the type described above. It is embodied as a blind rivet nut. In this blind rivet nut, the area in the deformation section, where the closing head begins to be formed, is not defined. Instead, it depends in particular on the mounting arrangement. When the blind rivet nut is being set, a circumferential bead forms in the area of the deformation section. This bead is thus closed in the circumferential direction of the shank, and consequently describes a complete circle. The thin-walled article, especially metal sheet, is fixed between this circumferential bead and the setting head.

In order to attain a defined design of the circumferential bead, EP 1 918 596 A1 provides that the shank has a weakening in a central circumferential area of the deformation section. This weakening is attained in particular by means of a plurality of holes in the shank. After the blind rivet element has deformed, a closing head in the shape of a circumferential bead forms in a defined manner due to the weakening of the shank wall.

U.S. Pat. No. 3,789,728 describes another type of blind rivet element. In this case, the blind rivet element is embodied as a blind rivet nut. Its shank is provided with a plurality of through-slits arranged parallel to the center longitudinal axis of the shank. Consequently, no bead-like closing head is created when the blind rivet element is being set. Instead, rosettes are bent out of the material. These rosettes have quite a large radial extension compared to a bead. A wedge-shaped intermediate space forms between adjacent rosettes. Because of the large radial extension of the deformed sections of the blind rivet nut, its outer radial position on the metal sheet is quite a distance from the center longitudinal axis of the shank.

The above-described blind rivet elements may be connected to thin-walled articles, especially metal sheet, only if there is sufficient room behind the thin-walled element for the blind rivet element to deform radially outwardly in the area of its deformation section when the blind rivet element is set. This is particularly true for those embodiments of the blind rivet element that forms rosettes when they are set.

SUMMARY OF THE INVENTION

One object of the present invention is to create a blind rivet element in which it is not fundamentally necessary for the closing head to be designed with a bead that describes a complete circle, or in which it is not desired that the closing head be designed with a bead that describes a complete circle, because it would collide with another article.

For attaining this object, a blind rivet element is suggested according to the features of the type of element cited in the foregoing. In this blind rivet element, the shank is configured such that in the area of the shank in which a bead is not desired, the bead is prevented from forming by removing material from the shank.

The inventive blind rivet element may thus be used in two basic applications. One such situation is where it is not possible to use a conventional blind rivet element because the circumferential bead cannot be properly formed during setting because there is an article in the expansion path of the shank when the blind rivet element is being installed. In this case the blind rivet element cannot be properly set unless it does not deform in the direction of the article disposed immediately adjacent to the blind rivet element. In the other situation, there is sufficient room for the circumferential bead when the blind rivet element is set. However, for certain reasons, this space should not be completely occupied. So, when the blind rivet element is set, it is enough to create a bead that is only a partial circle. Therefore, no bead forms in the remaining part of the circle. Such a bead design in a blind rivet element may be advantageous, for example, if the blind rivet element is acted upon by forces that have a substantial radial component. In this case it is not of decisive importance that the maximum clamping surface is created between bead and setting head via a circumferential bead.

In the present inventive blind rivet element, the shank is thus configured such that removing material from the shank prevents formation of the bead in the area of the shank in which it is desired that the bead does not form.

As long as it is assured that the bead does not form in the area of interest of the shank, the associated material may be removed from the shank in a variety of ways, and in different amounts.

During production of the blind rivet element, material may be removed from the shank in the area of interest by adding a void, aperture, hole, recess, or the like in the shank when the blank is pressed, for example. Alternatively, during production of the blind rivet element, material may be removed from the shank in the area of interest by a mechanical machine, for instance. Often, removing material in the area of interest of the shank will attain the inventive purpose even though the removal of the material does not lead to a through-hole being formed in the shank. Just this measure may assure that in this area, the shank has so little material that no bead forms when the blind rivet element is being set. This is considered preferable, because this is the simplest way to prevent the bead from forming, and removing material from the shank. The shank has a hole, especially a hole that has a circular cross-section prior to the blind rivet element being set. As described, what this hole attains, especially the hole that has a circular cross-section prior to the blind rivet element being set, is that there is not enough material available to contribute to forming a bead when the blind rivet element is set. Therefore no bead forms in this area of the shank.

Material is removed in the area of the shank, and thus the wall thickness of the shank wall is reduced relative to the adjacent area of the shank wall, which is not reduced in thickness. This allows bead formation to be prevented in a defined shank area. Specifically, bead formation may be prevented in the area in which the material of the shank has been reduced. Removing material from the shank at one or two locations on the shank makes it possible to define one or two shank areas in which no bead is produced when the blind rivet element is set. When material is removed in the area of one location on the shank, no bead is produced on one side of the shank. If there are two areas in which the material is removed from the shank, especially areas that are arranged on outer sides of the shank, this forms two areas in these outer sides of the shank in which no bead form.

This configuration of the blind rivet element makes it possible for example to use the blind rivet element, if it is to be mounted, after it has been inserted through a hole in a floor of a channel-shaped component, when the channel-shaped component has a limiting wall parallel to the longitudinal extension of the shank. It is possible to set the blind rivet element in the area of the limiting wall because material from the shank has been removed in the area of the limiting wall, and when the blind rivet element is being placed, the shank does not deform, or deforms only in an insignificant manner, in the direction of the limiting wall. It is only in this area of the limiting wall that no bead is formed. The bead is present in the remaining circumferential area of the shank after the blind rivet element has been set. Thus the blind rivet element is securely attached to the thin-walled component, and in the area of the floor of the channel-shaped component, but it is also positioned near the limiting wall.

If the channel-shaped component is very narrow, so that two limiting walls are arranged relatively close to one another, it is provided that the blind rivet element has the shank with reduced material thickness on the outer sides. Thus the material is removed from these outer sides of the shank. This prevents the bead from forming on these two outer sides of the shank. The bead is prevented from forming in particular in that the shank has a hole. Prior to the setting of the blind rivet element, the extension of the hole in the axial direction of the shank is at least equal to the extension of the deformation section in the axial extension of the shank after the blind rivet element has been set. In particular, this ensures that no bead can form in this area of the shank. This is because there is no material available for contributing to forming the bead, because the associated material was removed when the hole was made.

Additional features of the invention are provided in the subordinate claims, the description of the figures, and the figures themselves. It should be noted that all individual features and all combinations of individual features are essential to the invention.

The invention is depicted using a plurality of embodiments for different applications in an exemplary manner without being limited thereto.

These and other features, advantages, and objects of the present invention will be further understood and appreciated by those skilled in the art by reference to the following specification, claims, and appended drawings.

BRIEF DESCRIPTION OF THE DRAWINGS

FIGS. 7 and 8 show a second exemplary embodiment of the blind rivet element embodied as a blind rivet nut, shown in a view and a section as in FIGS. 1 and 2;

FIGS. 9 and 10 show the arrangement of the blind rivet nut and the thin-walled article (metal sheet) as shown in FIGS. 3 and 4, wherein FIG. 10 is a plan view seen from the direction of the arrow X according to FIG. 9;

FIGS. 11 and 12 show an arrangement of the blind rivet nut according to the embodiment in FIGS. 7 and 8 and a component cooperating therewith in views like those in FIGS. 5 and 6, wherein the component has a floor and two parallel limiting walls, and FIG. 12 is a plan view seen from the direction of the arrow XII according to FIG. 11;

DETAILED DESCRIPTION OF THE PREFERRED EMBODIMENTS

Figure 1:
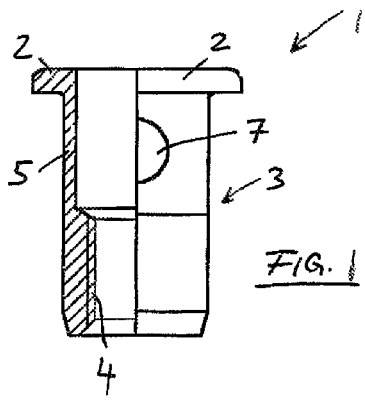
FIG. 1 shows as a first exemplary embodiment of the present invention, providing a view (right half) and a center longitudinal section (left half) of a blind rivet element embodied as a blind rivet nut.
Figure 2:
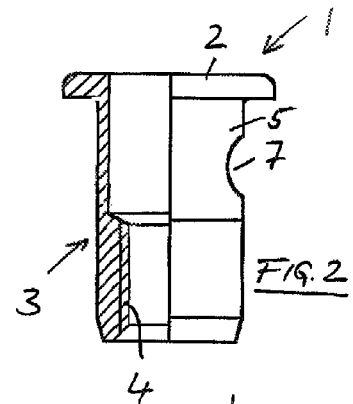
FIG. 2 shows a view and a center longitudinal section of the blind rivet nut from FIG. 1, but rotated 90° about its center longitudinal axis compared to the depiction in FIG. 1.
Figure 3:
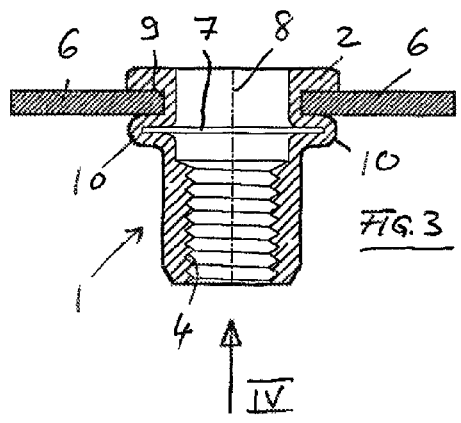
FIG. 3 shows a center longitudinal section of the arrangement of a thin-walled article (metal sheet) and the blind rivet nut from the embodiment in FIGS. 1 and 2 after the blind rivet nut has been set.
Figure 5:
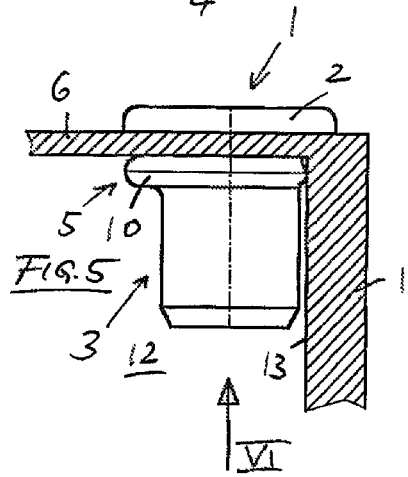
FIG. 5 shows the blind rivet nut from the embodiment in FIGS. 1 and 2, inserted into a leg of an L-shaped article that defines a cavity.

For purposes of description herein, the terms "upper," "lower," "right," "left," "rear," "front," "vertical," "horizontal" and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1 and 2 illustrate a first embodiment of the present invention, which is a blind rivet nut 1 before it is set. The blind rivet nut 1 has a setting head 2 and a shank 3. The shank 3 is provided with a female thread 4 in the area of its end distal to the setting head 2. The shank 3 is provided with a deformation section 5 between the female thread 4 and the setting head 2. Fundamentally, this deformation section 5 extends up to the setting head 2, since the blind rivet nut 1 could deform in this area if a tensile force is introduced into the female thread 4. In practice, since the blind rivet nut 1 is to be connected to a plate-shaped component 6, especially a metal sheet 6, this deformation section 5 normally extends only from the area of the female thread 4 to the side of the plate-shaped component 6 that faces away from the setting head 2.

The setting head 2 has a larger outer diameter than the shank 3. The outer diameter of the shank 3 is constant. The inner diameter of the shank 3 in the area of the deformation section 5 is also constant, and is equal to the inner diameter of the setting head 2. The inner diameter of the female thread 4 is smaller than the inner diameter of the shank 3 in the area of the deformation section 5. The aforesaid relationships do not apply to the blind rivet nut 1 after it has been deformed.

The deformation section 5 includes a void, aperture, hole, recess or the like, generally designated by the reference numeral 7, which is formed by the removal of material from a predetermined area of the deformation section 5, interrupts the bead 10, and defines a generally non-arcuate edge 14 along that portion of the bead 10 disposed adjacent to the void 7 in the deformation section 5 when the blind rivet element 1 is inelastically deformed to the set condition, as best shown in FIGS. 3-6.

In the examples illustrated in FIGS. 1-6, the blind rivet nut 1 is provided with a hole 7 in the area of its deformation section 5 that has a circular cross section, and passes through the shank 3. For example, in the blind rivet nut 1, the outer diameter of the shank 3 is 9 mm and the diameter of the hole 7 is 4 mm. The axis of rotation of the hole 7 intersects the center longitudinal axis of the deformation section 5 of the shank 3 in the blind rivet nut 1 that has not yet been set.

The shank 3 of the blind rivet nut 1 is inserted through a hole 9 that has a circular section in the metal sheet 6. The outer diameter of the shank 3 of the blind rivet nut 1 is slightly smaller than the diameter of the hole 9. The setting head 2 of the blind rivet nut 1 is positioned against the metal sheet 6. Then a threaded mandrel (not shown) is introduced in the area of the setting head 2 into the blind rivet nut 1. From there, the threaded mandrel is screwed into the female thread 4. As illustrated in FIG. 3, wherein the blind rivet nut 1 has already been set, the blind rivet nut 1 is fastened by means of the threaded mandrel setting device that is placed on the setting head 2. When the blind rivet nut 1 is being set, force is introduced via the female thread 4 into the blind rivet nut 1 with the setting head 2 fixed axially in plate 6. This causes the blind rivet nut 1 to deform in the area of the deformation section 5. A bead 10 thus forms, which in the example shown in FIGS. 1-6 has a generally arcuate plan shape. However, as can be seen from the depiction in FIG. 4, the bead 10 is not continuous, and does not describe a complete circle. On the contrary, it is interrupted. Due to material being removed from the shank 3 by the embodiment of the hole 7, when the blind rivet nut 1 is set, there is no material, or only very little material, available in this area of the shank 3 to form a bead in the area associated with hole 9 when the blind rivet nut 1 is set. The radial outer contour of the bead 10 extends across an angle of approximately 270° relative to the center longitudinal axis 8 of the blind rivet nut 1.

Figure 4:
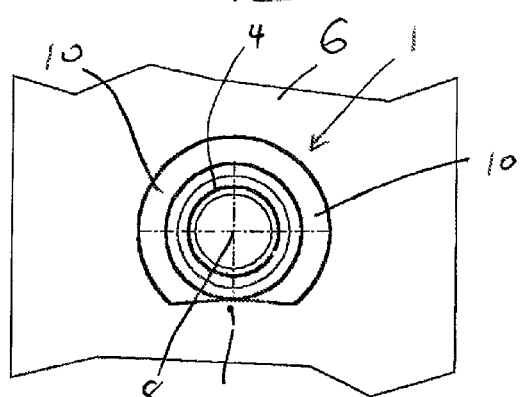
FIG. 4 shows a plan view of the arrangement according to FIG. 3, seen from the direction of the arrow IV in FIG. 3.
Figure 6:
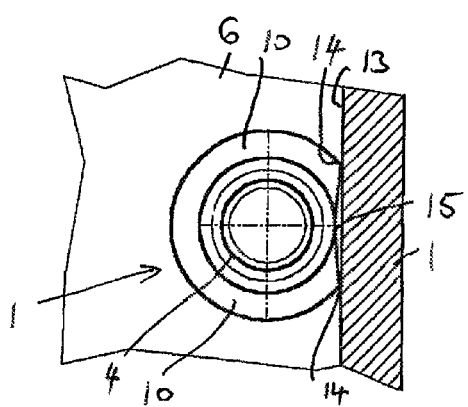
FIG. 6 shows the arrangement from FIG. 5, seen from the direction of the arrow VI in FIG. 5.

As can be seen from the depiction in FIG. 4, after the blind rivet element has been set, the side of the deformation section 5 in the area of which no bead 10 forms along edge 14 is essentially a limiting surface that is arranged perpendicular to the metal sheet 6, and runs generally tangential to the shank 3 in the area of the outer contour of the shank 3 that faces away from the female thread 4. As can be seen especially in the depictions in FIGS. 5 and 6, this makes it possible to attach the blind rivet nut 1 in the embodiment shown in FIGS. 1 and 2 to an article that has the plate-shaped component 6 and a limiting wall 11 that runs perpendicular thereto. This limiting wall 11, the plate-shaped component 6, and other components (not shown) form in particular a cavity 12 (FIG. 12). The shank 3 of the blind rivet nut 1 is inserted through the hole 9 into the plate-shaped component 6. The shank 3 extends beyond the component 6 into the cavity 12. The hole 7 is arranged immediately adjacent to the inner surface 13 of the limiting wall 11. When the blind rivet nut 1 is being set, that is, when the deformation section 5 is being deformed against the component 6, the area 15 facing the limiting wall 11 does not deform. This is because, due to the embodiment of the shank 3 with the hole 7, there is not enough material present there to form the bead 10 adjacent to the limiting wall 11.

In this context, it does not matter if there are slight projections 14 at the end areas of edge 14 on the bead 10 when the blind rivet nut 1 deforms. In the area of these projections 14, the blind rivet nut 1 contacts the limiting wall 11 or the projections 14 dig slightly into the limiting wall 11. The element formed by the limiting wall 11 and the leaf-shaped component 6 preferably comprise aluminum or plastic.

The embodiment of the blind rivet nut 1 in FIGS. 7 and 8 is distinguished from the embodiment in FIGS. 1 and 2 only in that, instead of one hole 7, there are two holes 7 with the identical dimensions and arrangement. They are arranged on the outward facing sides of the shank 3 in the area of the deformation section 5. The center longitudinal axis of the holes 7 thus intersects the center longitudinal axis of the deformation section 5 at a right angle, relative to the unset blind rivet nut 1. Consequently, when the blind rivet nut 1 is set, the bead 10 is being interrupted, not once, as it is with the exemplary embodiment in FIGS. 1 through 6, but twice. Thus two areas 15 are formed on the outer sides of the shank 3 with the bead 10 therebetween. This design of the blind rivet nut 1 with the two areas 15 in which the material in the shank 3 is removed by the creation of holes 7 to prevent formation of the bead makes it possible to attach the blind rivet nut 1 to a channel-shaped component that forms a cavity between opposing flanges. The channel-shaped component or is formed by the plate-shaped component or web 6, and two limiting walls or flanges 11 that are arranged parallel to one another and perpendicular to the plate-shaped component 6. Despite the small distance between the two limiting walls 11, which is clearly smaller than the diameter of the blind rivet nut 1 in the area of the deformed deformation section 5, the blind rivet nut 1 may be positioned between the two limiting walls 11, and set in place there. In this example, the deformation of the blind rivet nut 1 occurs only in the longitudinal extension of the channel formed between the limiting walls 11.

In the examples shown in FIGS. 1 and 3 and FIGS. 7 and 9, each hole 7 has a diameter selected such that its extension in the axial direction of the shank 3 prior to the blind rivet element 1 being set, is at least equal to the extension of the deformation section 5 in the axial direction of the shank 3 after the blind rivet element 1 has been set.

Instead of the blind rivet element being designed as a blind rivet nut 1, the blind rivet element may certainly be designed as a blind rivet threaded bolt. In this case, the shank in the area distal to the setting head, has a receptacle for a threaded bolt, and has the deformation section disposed between the receptacle for the threaded bolt and the setting head.

Figure 13:
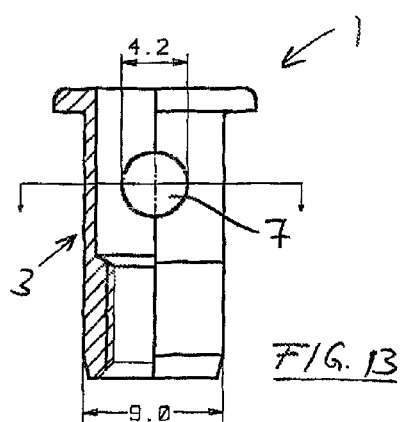
FIGS. 13 through 19 are various views of the blind rivet nut embodied according to FIGS. 7 and 8 and arranged according to FIGS. 9 and 10, including a basic depiction of a blind rivet nut for clarifying the geometric relationships and forces, with dimensions provided.
Figure 14:
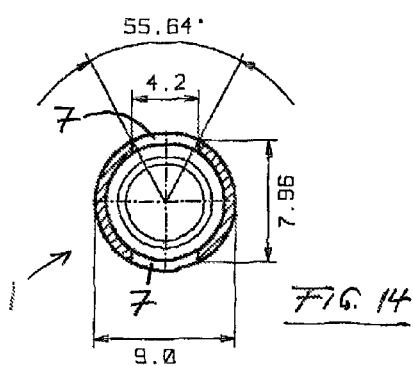

FIGS. 13 and 14 depict a blind rivet nut 1 that is embodied according to the exemplary embodiment in FIGS. 7 and 8. In the actual test arrangement, this blind rivet nut 1 has two opposing holes 7, each having a diameter of 4.2 mm. The shank 3 has an outer diameter of 9 mm. This can be seen in FIG. 13. As can be seen in FIG. 14, because of these geometric relationships, seen over the arc of the shank 3 in the area of the deformation section 5, the computed opening in the non-deformed blind rivet nut 1 is 4.2 mm and each deformation section 5 between the two holes 7 is 7.96 mm. The takeout angle in the area of each hole 7 is 55.64°.

Figure 15:
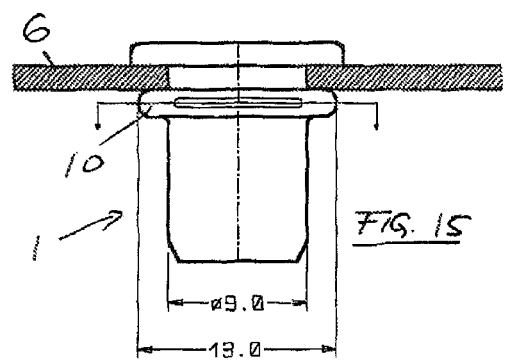
Figure 16:
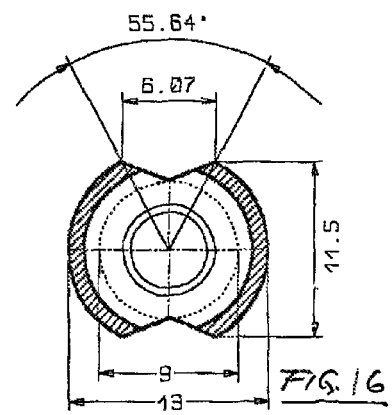

FIG. 15 depicts the blind rivet nut 1 riveted into the plate-shaped component 6, and having a bead 10. In practice, the outer diameter of the bead is for example 13 mm, as illustrated in FIG. 15. FIG. 16 illustrates actually expected dimensions in the area of the bead 10 when the nut is set. It may be expected that when the nut is set the 55.64° takeout angle of the hole will remain the same in the area of the bead 10, as well. This would mean that the takeout angle of the deformed hole 7 on the circumference of the bead 10 would have to be 6.7 mm. Consequently, the outer arc of each bead 10 would be 11.5 mm. Surprisingly, however, in practice this is not the case. Instead, FIG. 17 essentially depicts what actually happens. The takeout angle (55.64°) is significantly enlarged, and the dimension of only 9.8 mm according to FIG. 17 results instead of the dimension 11.5 mm according to FIG. 16. Consequently both beads 10 in FIG. 17, which correspond to those in FIG. 10, are arranged essentially on opposing sides of the blind rivet nut 1.

Figures 18, 19:
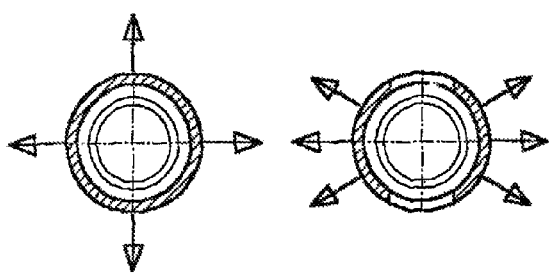
Figure 17:
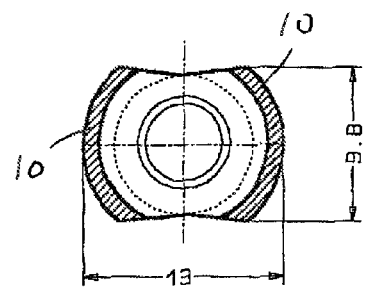

FIGS. 18 and 19 provide possible explanations for the unexpected deformation of the bead 10 in FIG. 17.

FIG. 18 illustrates that uniform deformation forces act on the circumference of the deformation section 5 and form the bead in a blind rivet nut 1 in which the shank 3 does not have any holes 7. These forces are shown across the complete circle. Consequently, when such a blind rivet nut 1 is deformed the resulting bead on the circumference is precisely uniform. FIG. 19 illustrates that when the shank 3 is designed with the two holes 7, although it is entirely possible for only one hole 7 to be provided, the deformation forces act significantly more strongly diametrically. Only slight forces can act in the direction of the two holes 7. This seems to lead to the embodiment of the bead 10 or beads 10 in FIG. 17.

Figure 20:
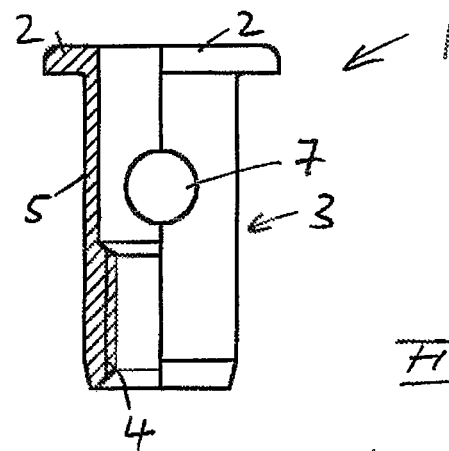
FIG. 20 shows the blind rivet nut in accordance with the exemplary embodiment according to FIGS. 7 and 8, in a depiction corresponding to these figures.
Figure 21:
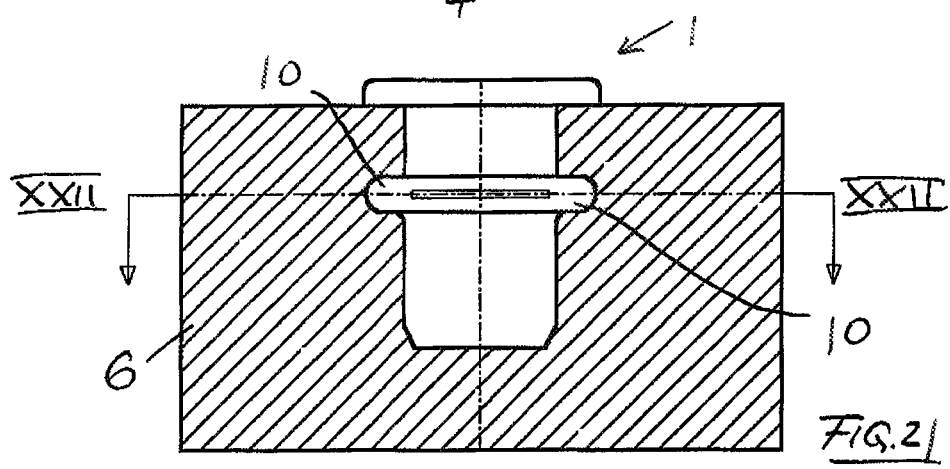
FIG. 21 shows the blind rivet nut according to the embodiment in FIG. 20 riveted to a compressible material.
Figure 22:
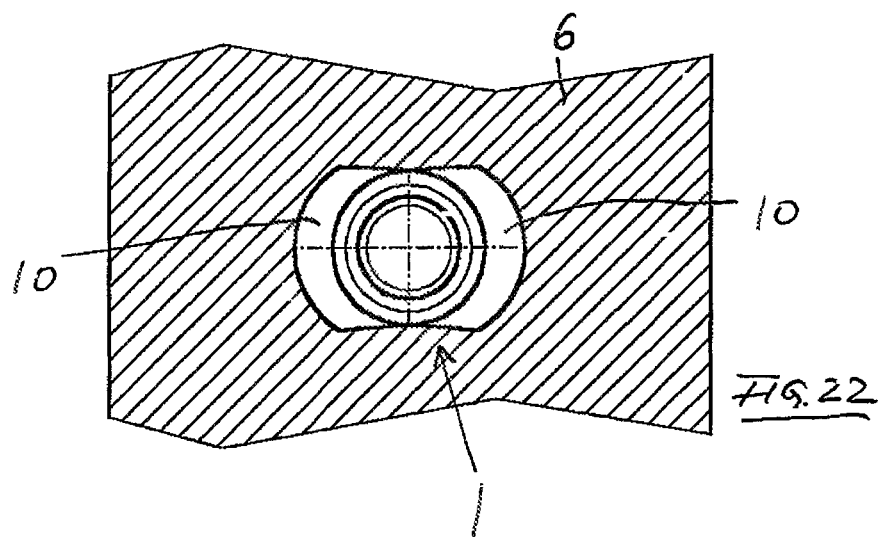
FIG. 22 is a section through the arrangement according to the line XXII in FIG. 21.
Figure 23:
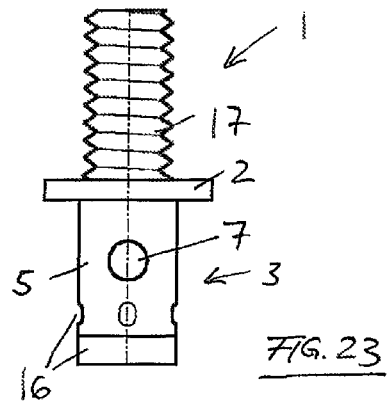
FIGS. 23 through 28 show a basic exemplary embodiment of the blind rivet element embodied as a blind rivet threaded bolt in depictions like those for the exemplary embodiment in FIGS. 7 through 12.
Figure 24:
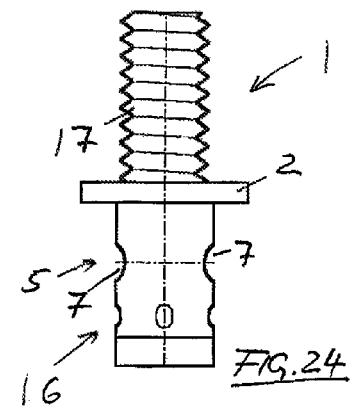

FIG. 20 illustrates the blind rivet nut 1 according to the exemplary embodiment in FIGS. 7 and 8. As can be seen in the depiction in FIGS. 21 and 22, this blind rivet nut 1 is riveted to a thick-walled component 6 that comprises a compressible material, e.g. wood. Since the deformation section 5 of the blind rivet nut 1 is disposed in the area of the component 6, when the blind rivet nut 1 is being set, this leads to the two beads 10 expanding into the compressible material. As can be seen in the depiction in FIG. 22, the embodiment of the two beads 10 provides an anti-rotation element for the blind rivet nut 1. This anti-rotation element would of course also be provided if only one bead 10 were to be formed, as in the exemplary embodiment of the blind rivet nut 1 in FIG. 1.

Figure 25:
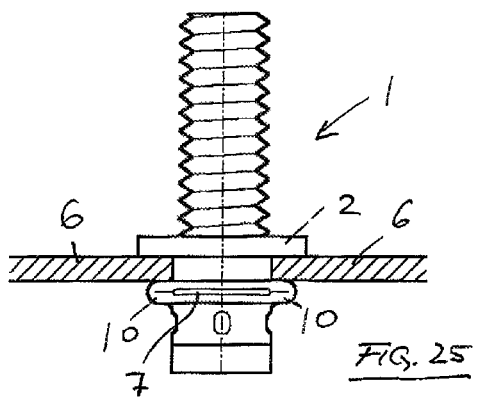
Figure 27:
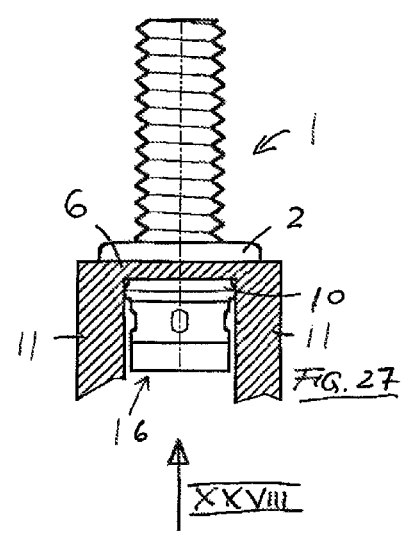
Figure 26:
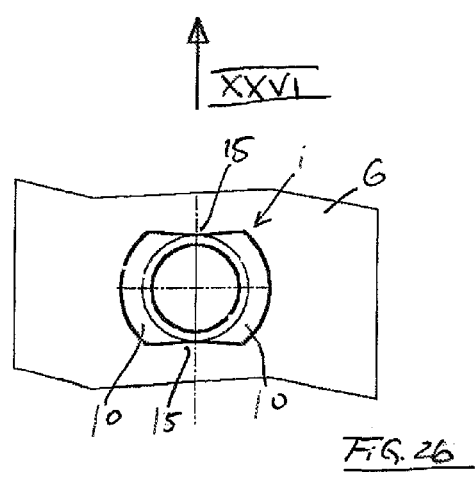
Figure 28:
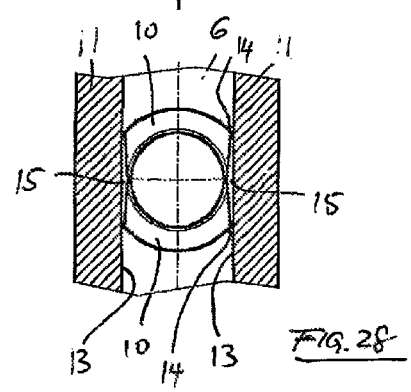

FIGS. 23 through 28 show an embodiment of the blind rivet element as a blind rivet threaded bolt 1 and its use with a plate-shaped component 6, as depicted in FIGS. 25 and 26, and with a component 6 that has parallel limiting walls 11, as in FIGS. 27 and 28. Parts that coincide with the embodiments in FIGS. 7 through 12 are marked with the same reference numbers in FIGS. 23 through 28. FIG. 26 is a view according to the arrow XXVI in FIG. 25. FIG. 28 is a view according to the arrow XXVIII in FIG. 27.

As can be seen from the depiction of the blind rivet element 1, which is embodied as a blind rivet threaded bolt according to the depictions in FIGS. 23 through 28, the shank 3 of the blind rivet threaded bolt has a receptacle 16 for a threaded bolt 17 in the area of its end distal to the setting head 2. It has the deformation section 5 between the receptacle 16 and the setting head 2. Refer to the information provided in the foregoing regarding the embodiment in FIGS. 7 through 12 for a more detailed description of the exemplary embodiment in FIGS. 23 through 28.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A combination of a blind rivet element and a workpiece, comprising:
    a setting head portion of the blind rivet element having a predetermined outside diameter, and being shaped for abutting engagement with a first section of the workpiece;
    a shank portion of the rivet element having a first end thereof connected with said setting head portion, a predetermined outside diameter that is smaller than said outside diameter of said setting head portion and is configured for close reception in an aperture in the first section workpiece, an opposite second end thereof having a receptacle for a threaded bolt, and a deformation section disposed axially with a consistent outside diameter between said setting head portion and said receptacle for a threaded bolt and configured to inelastically deform to a set condition that protrude radially outwardly of said outside diameter of said shank portion and that compresses the first section of the workpiece between the setting head portion and the deformation section; and
    wherein said deformation section includes a void that is configured to form a generally non-arcuate edge along that portion of said deformation section when said blind rivet element is inelastically deformed to said set condition, and wherein the generally non-arcuate edge abuts a second section of the workpiece generally orthogonal to the first section and adjacent the second edge of the shank portion, such that the blind rivet element is prevented from rotating relative to the workpiece.

2. The combination of the blind rivet and the workpiece of claim 1, wherein:
    said void comprises a hole in said deformation section having in-, an unset condition, a width oriented parallel with the axial centerline of said shank portion.

3. The combination of the blind rivet and the workpiece of claim 2, wherein:
    said hole has a generally circular plan shape in said unset condition.

4. The combination of the blind rivet and the workpiece of claim 3, wherein:
    said hole comprises a through aperture in said deformation section.

5. The combination of the blind rivet and the workpiece of claim 2, wherein:
    said hole comprises a through apeture in said deformation section.

6. The combination of the blind rivet and the workpiece of claim 1, wherein:
said void comprises a first void formed in a first side of said deformation section that is configured to form, in set condition, a first non-arcuate edge which extends generally along said first side of said deformation section.

7. The combination of the blind rivet and the workpiece of claim 6, wherein:
said void further comprises a second void formed in a second side of said deformation section, which in said set condition is configured to form a second generally non-arcuate edge which extends generally along said second side of said deformation section.

8. The combination of the blind rivet and the workpiece of claim 7, wherein:
said first and second sides of said deformation section are disposed diametrically opposite each other relative to the axial center line of said shank portion.

9. The combination of the blind rivet and the workpiece of claim 8, wherein:
said deformation section is configured to deform radially outward to the set condition to form a bead that is defined by first and second bead portions disposed diametrically opposite each other relative to the axial center line of said shank portion.

10. The combination of the blind rivet and the workpiece of claim 1, wherein:
said non-arcuate edge is oriented generally tangentially relative to said outside diameter of said shank portion.

11. A blind rivet element and a workpiece, comprising:
a first planar section of the workpiece having an aperture for receiving the blind rivet element;
a section planar section of the workpiece extending orthogonally from the first planar section adjacent the aperture; a setting head portion of the blind rivet element abutting the first planar section of the workpiece;
a shank portion of the blind rivet element extending through the aperture in the workpiece with a diameter less than the setting head portion and having a first end connected with the setting head portion, an opposite second end having a receptacle for a threaded bolt, and a deformation section disposed between the setting head portion and the receptacle adjacent the second planar section, wherein the deformation section protrudes radially outwardly from the shank portion in a set condition to define a bead that abuts the workpiece on a side opposite the setting head portion, such that the workpiece is compressed between the setting head portion and the deformation section in the set condition, and wherein the deformation section includes a void that defines a generally non-arcuate edge along the bead in abutting contact with the second planar section to prevent rotation of the blind rivet element relative to the workpiece.

12. The blind rivet element and the workpiece of claim 11, wherein the non-arcuate edge defined by the void is adapted to position the shank portion adjacent to the second planar section of the workpiece in closer proximity than the outside diameter of the bead.

13. The blind rivet element and workpiece of claim 11, wherein the non-arcuate edge defined by the void is adapted to abut the second planar section of the workpiece for preventing rotation of the setting head portion relative to the workpiece.

* * * * *

UNITED STATES PATENT AND TRADEMARK OFFICE
CERTIFICATE OF CORRECTION

PATENT NO. : 8,961,087 B2
APPLICATION NO. : 13/680335
DATED : February 24, 2015
INVENTOR(S) : Herbert Schruff It is certified that error appears in the above-identified patent and that said Letters Patent is hereby corrected as shown below:

In the Specification

Col. 3, line 22;

"form" should be --forms--.

Col. 6, line 48;

delete "or".

Col. 6, lines 63 and 65;

"element" should be --nut--.

In the Claims

Col. 8, claim 1, line 27;

after "the" insert --blind--.

Col. 8, claim 1, line 32;

after "section" insert --of the--.

Col. 8, claim 1, line 37;

"protrude" should be --protrudes--.

Col. 8, claim 2, line 54;

"having in-," should be --having, in--.

Signed and Sealed this
Seventh Day of July, 2015

Michelle K. Lee
*Director of the United States Patent and Trademark Office*

CERTIFICATE OF CORRECTION (continued)
U.S. Pat. No. 8,961,087 B2

Col. 9, claim 6, line 4;

after "in" insert --the--.

Col. 10, claim 11, line 1 (1$^{st}$ occurrence);

"section" should be --second--.

Col. 10, claim 11, line 3;

after "aperture;" insert --[return/paragraph]--.

Col. 10, claim 11, line 4;

after "workpiece;" insert --and--.